US010384129B2

(12) United States Patent
Rabin

(10) Patent No.: US 10,384,129 B2
(45) Date of Patent: Aug. 20, 2019

(54) SYSTEM AND METHOD FOR DETECTING MOMENT OF IMPACT AND/OR STRENGTH OF A SWING BASED ON ACCELEROMETER DATA

(71) Applicant: Nintendo Co., Ltd., Kyoto (JP)

(72) Inventor: Steven Rabin, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/645,099

(22) Filed: Jul. 10, 2017

(65) Prior Publication Data
US 2017/0304731 A1 Oct. 26, 2017

Related U.S. Application Data

(63) Continuation of application No. 15/178,904, filed on Jun. 10, 2016, now Pat. No. 9,700,795, which is a
(Continued)

(51) Int. Cl.
*A63F 13/577* (2014.01)
*A63F 13/211* (2014.01)
(Continued)

(52) U.S. Cl.
CPC .......... *A63F 13/577* (2014.09); *A63F 13/06* (2013.01); *A63F 13/211* (2014.09); *A63F 13/219* (2014.09); *A63F 13/285* (2014.09); *A63F 13/428* (2014.09); *A63F 13/812* (2014.09); *F41A 33/00* (2013.01); *G10H 1/0008* (2013.01); *A63F 13/814* (2014.09);
(Continued)

(58) Field of Classification Search
CPC ............................ G06F 3/0219; A63F 13/211
See application file for complete search history.

(56) References Cited

U.S. PATENT DOCUMENTS

| 4,759,219 A | 7/1988 | Cobb |
| 4,776,253 A | 10/1988 | Downes |

(Continued)

FOREIGN PATENT DOCUMENTS

| JP | H06-190144 | 7/1994 |
| JP | 8-123611 | 5/1996 |

(Continued)

OTHER PUBLICATIONS

Japanese Office Action issued for Japanese Application No. 2009-509794 dated Oct. 5, 2012.
(Continued)

*Primary Examiner* — Reginald A Renwick
(74) *Attorney, Agent, or Firm* — Nixon & Vanderhye, P.C.

(57) ABSTRACT

An example system and method is provided for detecting a moment of impact and/or strength of a swing based on moving a hand-held device including an accelerometer arrangement. A moment and a magnitude of simulated striking of the object are determined based on one or more accelerometer arrangement outputs resulting from the moving of the hand-held device. Using one or more of aural, visual and tactile outputs, the striking of the object is simulated in accordance with the determined moment of simulated striking and the determined magnitude of the simulated striking.

21 Claims, 9 Drawing Sheets

Related U.S. Application Data continuation of application No. 14/320,998, filed on Jul. 1, 2014, now Pat. No. 9,364,748, which is a continuation of application No. 11/504,110, filed on Aug. 15, 2006, now Pat. No. 8,814,641.

(60) Provisional application No. 60/798,316, filed on May 8, 2006.

(51) Int. Cl.

| | | |
|---|---|---|
| *A63F 13/428* | (2014.01) | |
| *A63F 13/285* | (2014.01) | |
| *A63F 13/20* | (2014.01) | |
| *F41A 33/00* | (2006.01) | |
| *G10H 1/00* | (2006.01) | |
| *A63F 13/219* | (2014.01) | |
| *A63F 13/812* | (2014.01) | |
| *A63F 13/814* | (2014.01) | |

(52) U.S. Cl.
CPC . *A63F 2300/105* (2013.01); *A63F 2300/6045* (2013.01); *A63F 2300/638* (2013.01); *A63F 2300/8047* (2013.01); *G10H 2220/311* (2013.01); *G10H 2220/395* (2013.01); *G10H 2230/275* (2013.01)

(56) References Cited

U.S. PATENT DOCUMENTS

| | | | |
|---|---|---|---|
| 4,839,838 A | 6/1989 | LaBiche et al. | |
| 5,056,783 A | 10/1991 | Matavoich | |
| 5,128,671 A | 7/1992 | Thomas, Jr. | |
| 5,920,024 A | 7/1999 | Moore | |
| 5,989,157 A | 11/1999 | Walton | |
| 6,072,467 A | 6/2000 | Walker | |
| 6,183,365 B1 | 2/2001 | Tonomura et al. | |
| 6,647,359 B1 | 11/2003 | Verplank | |
| 7,874,918 B2* | 1/2011 | Osnato | A63F 13/06 273/148 B |
| 2001/0015123 A1 | 8/2001 | Nishitani et al. | |
| 2002/0065121 A1* | 5/2002 | Fukunaga | A63F 13/08 463/8 |
| 2003/0057808 A1 | 3/2003 | Lee et al. | |
| 2003/0078086 A1 | 4/2003 | Matsuyama et al. | |
| 2003/0222851 A1 | 12/2003 | Lai et al. | |
| 2004/0011189 A1 | 1/2004 | Ishida et al. | |
| 2004/0147317 A1 | 7/2004 | Ito et al. | |
| 2004/0252109 A1 | 12/2004 | Trent, Jr. et al. | |
| 2005/0017454 A1* | 1/2005 | Endo | G06F 3/016 273/317.1 |
| 2005/0070359 A1 | 3/2005 | Rodriquez et al. | |
| 2005/0134555 A1 | 6/2005 | Liao | |
| 2005/0174324 A1* | 8/2005 | Liberty | G06F 3/017 345/156 |
| 2006/0084516 A1 | 4/2006 | Eyestone et al. | |
| 2006/0094502 A1 | 5/2006 | Katayama et al. | |
| 2006/0123146 A1 | 6/2006 | Wu et al. | |
| 2006/0231794 A1 | 10/2006 | Sakaguchi et al. | |
| 2006/0252477 A1 | 11/2006 | Zalewski et al. | |
| 2007/0015588 A1 | 1/2007 | Matsumoto et al. | |
| 2007/0080931 A1* | 4/2007 | Chen | G06F 3/0219 345/156 |
| 2007/0091084 A1* | 4/2007 | Ueshima | A63F 13/211 345/419 |

FOREIGN PATENT DOCUMENTS

| | | |
|---|---|---|
| JP | 2000-308756 | 11/2000 |
| JP | 2001-056742 | 2/2001 |
| JP | 2002-023742 | 1/2002 |
| JP | 2005-046422 | 2/2005 |

OTHER PUBLICATIONS

International Search Report in Application No. PCT/US07/11077 dated Oct. 21, 2008.
Written Opinion of the International Search Authority dated Oct. 21, 2008.
European Search Report issued for European Application No. EP 07 79 4636 dated Jul. 31, 2012.
Gamespot:"TGS 2005: Iwata Speaks", Internet, Sep. 15, 2005 (Sep. 15, 2005), Retrieved from the Internet:URL:http://www.gamespot.com/news/tgs-2005-iwata-speaks-6133389 [retrieved on Jul. 2, 2012].
Fujii et al., Pointing Device for Notebook Computer, Feb. 11, 2001, Pub. No. JP2001-306245A.
Office Action dated Apr. 21, 2010 in U.S. Appl. No. 11/488,135.
Notice of Allowance dated Feb. 17, 2016 in U.S. Appl. No. 14/320,998.
Notice of Allowance dated Mar. 13, 2017 in U.S. Appl. No. 15/178,904.

* cited by examiner

NON-LIMITING
EXAMPLE GAME SYSTEM

NON-LIMITING EXAMPLE CONTROLLER

NON-LIMITING EXAMPLE CONTROLLER

SYSTEM AND METHOD FOR DETECTING MOMENT OF IMPACT AND/OR STRENGTH OF A SWING BASED ON ACCELEROMETER DATA

CROSS REFERENCE TO RELATED APPLICATION

This application is a continuation of U.S. patent application Ser. No. 15/178,904 filed Jun. 10, 2016, which is a continuation of U.S. patent application Ser. No. 14/320,998 filed Jul. 1, 2014 (now U.S. Pat. No. 9,364,748 issued Jun. 14, 2016), which is a continuation of U.S. patent application Ser. No. 11/504,110 filed Aug. 15, 2006 (now U.S. Pat. No. 8,814,641 issued Aug. 26, 2014), which claims the benefit of provisional Application No. 60/798,316, filed May 8, 2006, the contents of all of which are incorporated herein in their entirety.

BACKGROUND AND SUMMARY

This application generally describes a system and method for detecting a moment of impact and/or a strength of swing based on accelerometer data. The system and method may be applied by way of example without limitation in the context of a game system in which a player can use a controller provided with an accelerometer arrangement to simulate the striking of an object so as to play percussion instruments such as drums, cymbals, timpanis, tam-tams and the like. The system and method is however not limited to the simulated playing of musical instruments and can be readily applied to simulated sword-fighting, boxing and a wide variety of other applications.

User inputs to computer systems may be supplied in various ways. For example, when the computer system is a video game console, inputs are typically supplied using cross-switches, joysticks, buttons and the like provided on a controller. A cross-switch or a joystick may be used to control movement of a video game object in various directions and various buttons may be used to control character actions such as jumping, using a weapon and the like.

The controller described in this patent application additionally or alternatively includes an accelerometer arrangement that generates inputs to a video game console or other computer system based on certain movements and/or orientations of the controller. Such a controller can provide a more intuitive user interface in which, for example, movement of a video game object can be controlled by moving the controller in a particular manner. By way of illustration, a player may increase or decrease the altitude of a plane in a video game by tilting the controller up or down.

The accelerometer arrangement can be used to provide gaming experiences that cannot be provided easily (if at all) using a controller having cross-switches, joysticks, buttons, etc. This patent application describes a system and method which can be used to detect a moment of impact and/or a strength of a swing based on data from the accelerometer arrangement. The system and method can allow a player to, among other things, simulate the striking of an object by moving a controller. By way of example without limitation, a player can simulate the playing of drums by moving the controller as if it were a drumstick. Outputs of the accelerometer arrangement are used to determine the timing and the magnitude (intensity) of the striking of the drum, which can then be simulated using one or more of aural, visual and tactile outputs. For example, a speaker may be used to output the sound of a drum being struck and a display may show images of a drum being struck. Additionally or alternatively, the controller may include a vibration circuit that is activated to provide the player with a tactile sensation corresponding to the striking of the drum.

The system and method described in this patent application are not limited to simulating the playing of musical instruments and can also be applied, for example, to simulating the swinging of objects such as a sword by moving a controller.

DETAILED DESCRIPTION OF EXAMPLE EMBODIMENTS

Figure 1:
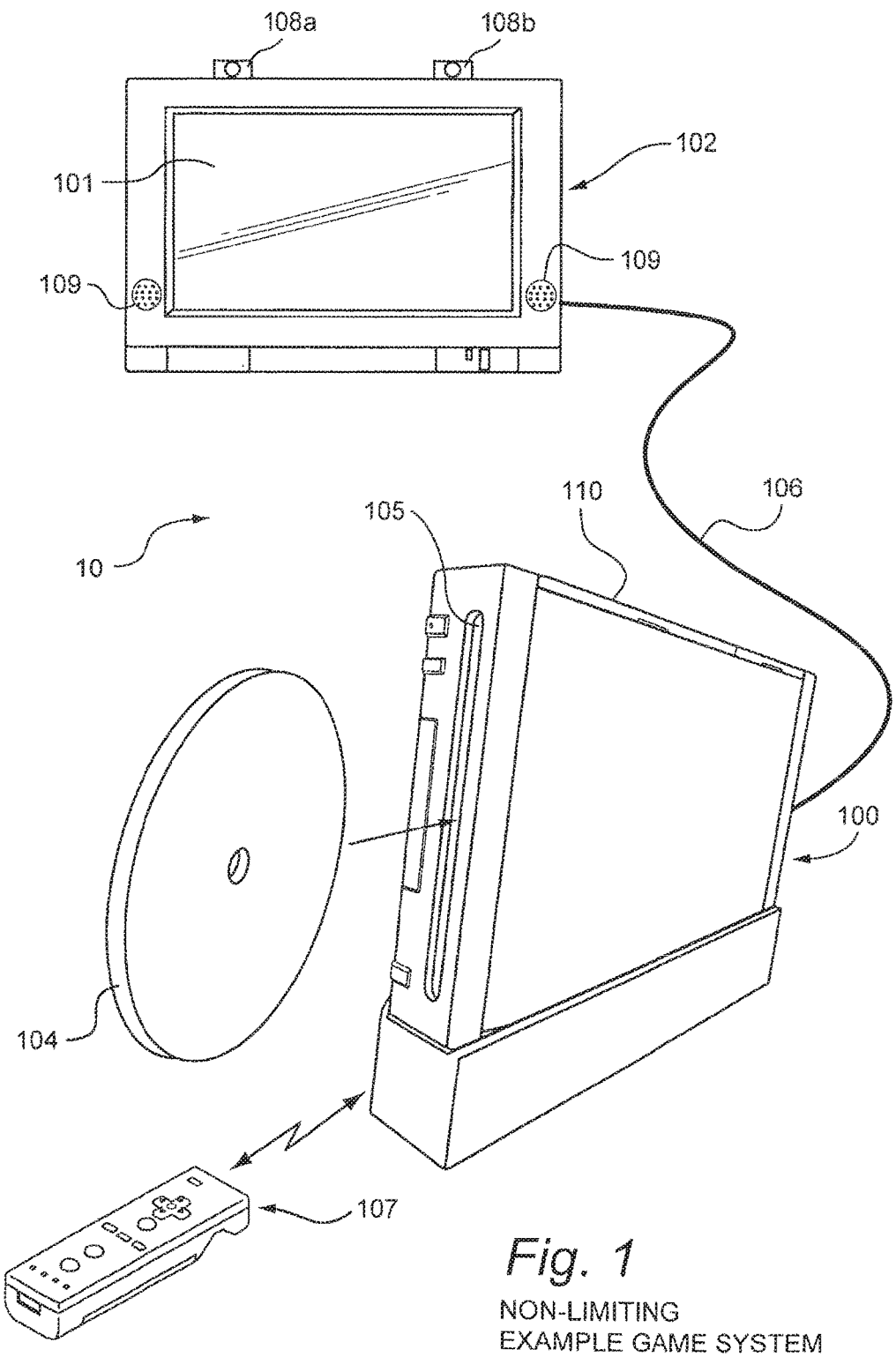
FIG. 1 is a diagram of an example game system 10.

FIG. 1 shows a non-limiting example game system 10 including a game console 100, a television 102 and a controller 107.

Game console 100 executes a game program or other application stored on optical disc 104 inserted into slot 105 formed in housing 110 thereof. The result of the execution of the game program or other application is displayed on display screen 101 of television 102 to which game console 100 is connected by cable 106. Audio associated with the game program or other application is output via speakers 109 of television 102. While an optical disk is shown in FIG. 1, the game program or other application may alternatively or additionally be stored on other storage media such as semiconductor memories, magneto-optical memories, magnetic memories and the like.

Controller 107 wirelessly transmits data such as game control data to the game console 100. The game control data may be generated using an operation section of controller 107 having, for example, a plurality of operation buttons, a key, a stick and the like. Controller 107 may also wirelessly receive data transmitted from game console 100. Any one of various wireless protocols such as Bluetooth (registered trademark) may be used for the wireless transmissions between controller 107 and game console 100.

As discussed below, controller 107 also includes an imaging information calculation section for capturing and processing images from light-emitting devices 108a and 108b. Although markers 108a and 108b are shown in FIG. 1 as being above television 100, they may also be positioned below television 100. In one implementation, a center point between light-emitting devices 108a and 108b is substantially aligned with a vertical center-line of display screen 101. The images from light-emitting devices 108a and 108b can be used to determine a direction in which controller 107 is pointing as well as a distance of controller 107 from display screen 101. By way of example without limitation, light-emitting devices 108a and 108b may be implemented as two LED modules (hereinafter, referred to as "markers") provided in the vicinity of the display screen of television 102. The markers each output infrared light and the imaging information calculation section of controller 107 detects the light output from the LED modules to determine a direction in which controller 107 is pointing and a distance of controller 107 from display 101 as mentioned above. As will become apparent from the description below, various implementations of the systems and methods described herein do not require use such markers.

Figure 2:
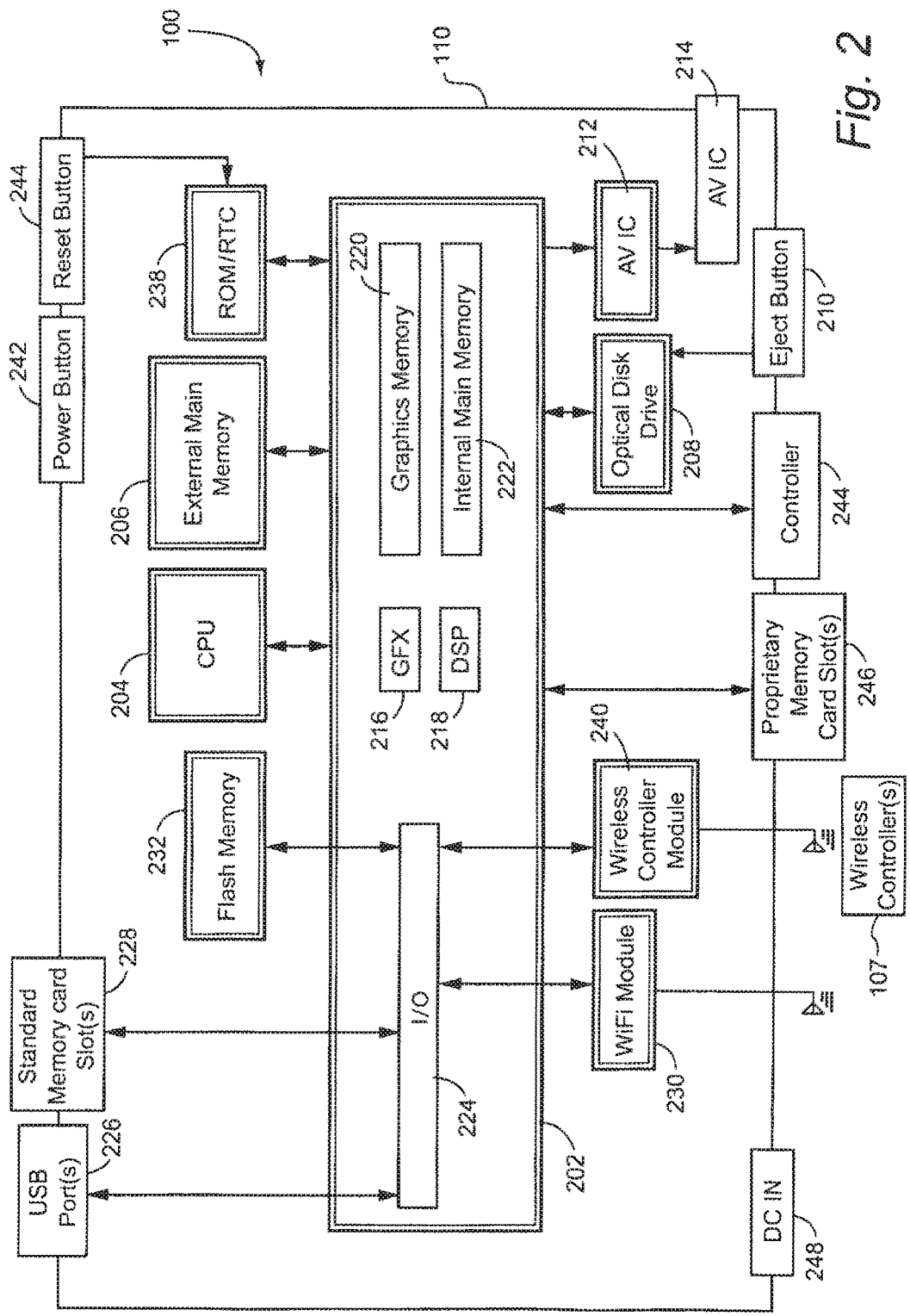
FIG. 2 is a block diagram of example game console 100 shown in FIG. 1.

With reference to the block diagram of FIG. 2, game console 100 includes a RISC central processing unit (CPU) 204 for executing various types of applications including (but not limited to) video game programs. CPU 204 executes a boot program stored, for example, in a boot ROM to initialize game console 100 and then executes an application (or applications) stored on optical disc 104, which is inserted in optical disk drive 208. User-accessible eject button 210 provided on housing 110 of game console 100 may be used to eject an optical disk from disk drive 208.

In one example implementation, optical disk drive 208 receives both optical disks of a first type (e.g., of a first size and/or of a first data structure, etc.) containing applications developed to take advantage of the capabilities of CPU 204 and graphics processor 216 and optical disks of a second type (e.g., of a second size and/or a second data structure) containing applications originally developed for execution by a CPU and/or graphics processor having capabilities different than those of CPU 204 and/or graphics processor 216. For example, the optical disks of the second type may be applications originally developed for the Nintendo GameCube platform.

CPU 204 is connected to system LSI 202 that includes graphics processing unit (GPU) 216 with an associated graphics memory 220, audio digital signal processor (DSP) 218, internal main memory 222 and input/output (TO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 100. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers but of course this use is provided by way of illustration, not limitation. For example, a player may store game data for a particular game on a memory card and bring the memory card to a friend's house to play the game on the friend's game console. The memory cards may also be used to transfer data between the game console and personal computers, digital cameras, and the like.

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module 230 may also be used for communication with other game devices such as suitably-equipped hand-held game devices. Module 230 is referred to herein as "WiFi", which is generally a designation used in connection with the family of IEEE 802.11 specifications. However, game console 100 may of course alternatively or additionally use wireless modules that conform to other wireless standards.

Flash memory 232 stores, by way of example without limitation, game save data, system files, internal applications for the console and downloaded data (such as games).

Wireless controller module 240 receives signals wirelessly transmitted from one or more controllers 107 and provides these received signals to IO processor 224. The signals transmitted by controller 107 to wireless controller module 240 may include signals generated by controller 107 itself as well as by other devices that may be connected to controller 107. By way of example, some games may utilize separate right- and left-hand inputs. For such games, another controller (not shown) may be connected (e.g., by wired connection) to controller 107 and controller 107 can transmit to wireless controller module 240 signals generated by itself and by the other controller.

Wireless controller module 240 may also wirelessly transmit signals to controller 107. By way of example without limitation, controller 107 (and/or another game controller connected thereto) may be provided with vibration circuitry and vibration circuitry control signals may be sent via wireless controller module 240 to control the vibration circuitry (e.g., by turning the vibration circuitry on and off). By way of further example without limitation, controller 107 may be provided with (or be connected to) a speaker (not shown) and audio signals for output from this speaker may be wirelessly communicated to controller 107 via wireless controller module 240. By way of still further example without limitation, controller 107 may be provided with (or be connected to) a display device (not shown) and display signals for output from this display device may be wirelessly communicated to controller 107 via wireless controller module 240.

Proprietary memory card slots 246 are adapted to receive proprietary memory cards. In one example implementation, two such slots are provided. These proprietary memory cards have some non-standard feature(s) such as a non-standard connector and/or a non-standard memory architecture. For example, one or more of the memory card slots 246 may be adapted to receive memory cards used with the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, respective wireless receivers may be connected to connectors 244 to receive signals from wireless game controllers. These connectors enable players, among other things, to use controllers for the Nintendo GameCube platform when an optical disk for a game developed for this platform is inserted into optical disk drive 208.

A connector 248 is provided for connecting game console 100 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 100 on and off. In one example implementation, power button 242 must be depressed for a specified time (e.g., one or two seconds) to turn the console off so as to reduce the possibility of inadvertently turn-off. Reset button 244 is used to reset (re-boot) game console 100.

Figure 3A:
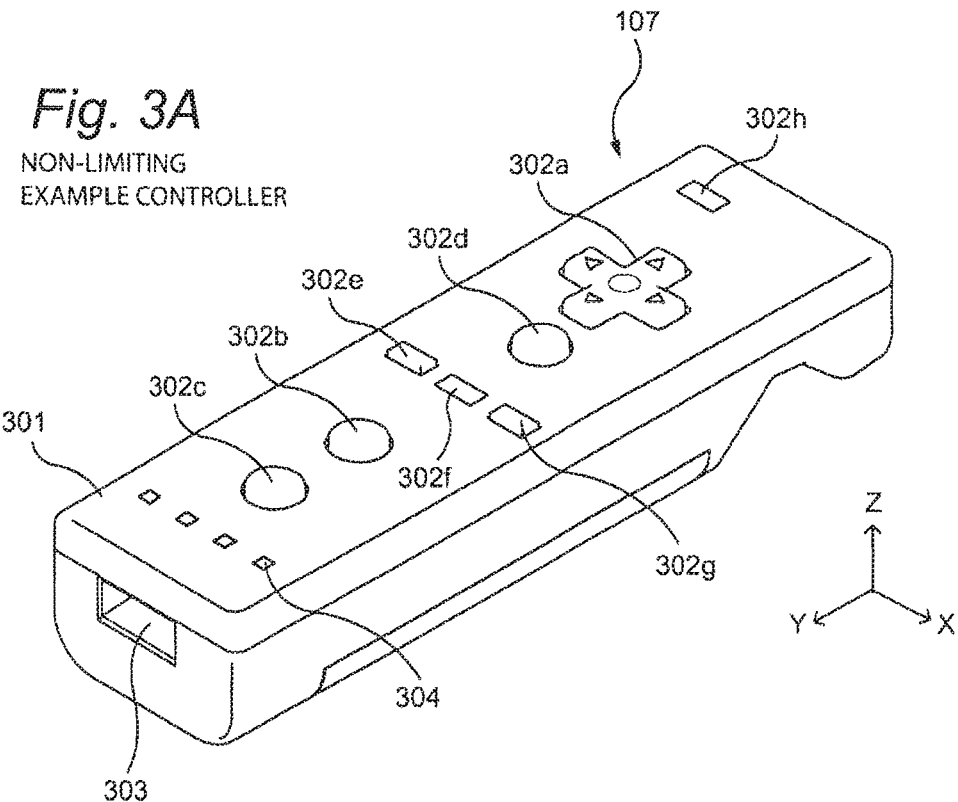
FIGS. 3A and 3B are perspective views of a top and a bottom of example controller 107 shown in FIG. 1.
Figure 3B:
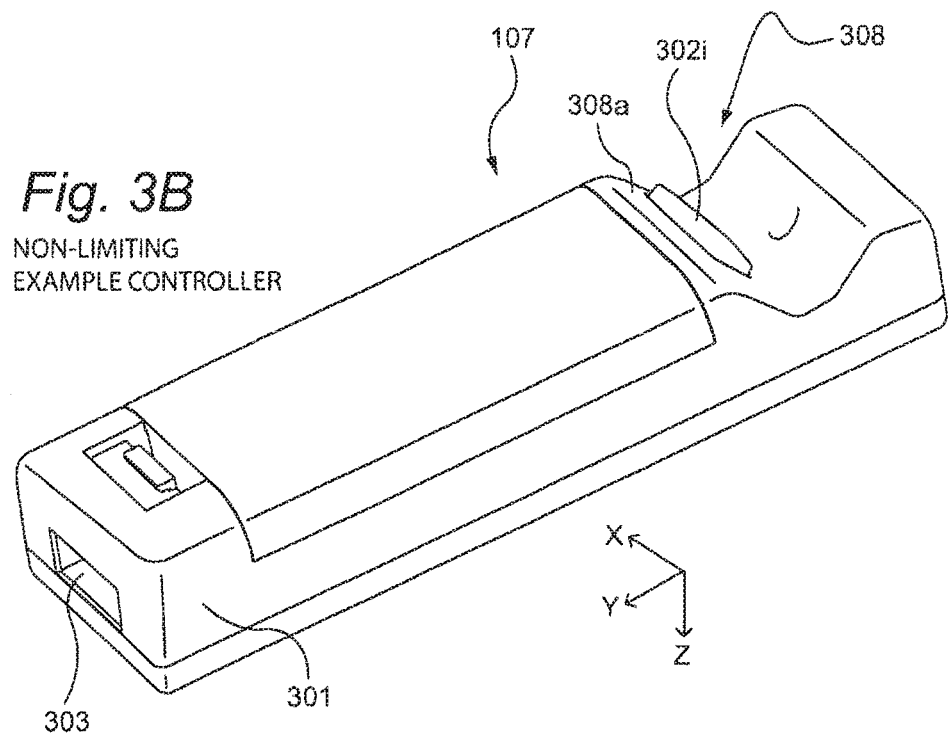
Figure 4:
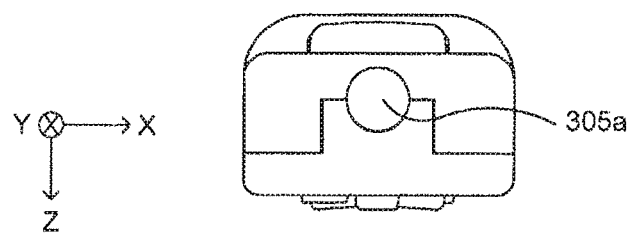
FIG. 4 is a front view of example controller 107 shown in FIG. 1.

With reference to FIGS. 3 and 4, example controller 107 includes a housing 301 on which operating controls 302a-302h are provided. Housing 301 has a generally parallelepiped shape and is sized to be conveniently grasped by a player's hand. Cross-switch 302a is provided at the center of a forward part of a top surface of the housing 301. Cross-switch 302a is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302a. By actuating cross-switch 302a, the player can, for example, move a character in different directions in a virtual game world.

Cross-switch 302a is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 301 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a player can be used.

Buttons (or keys) 302b through 302g are provided rearward of cross-switch 302a on the top surface of housing 301. Buttons 302b through 302g are operation devices that output respective signals when a player presses them. For example, buttons 302b through 302d are respectively an "X" button, a "Y" button and a "B" button and buttons 302e through 302g are respectively a select switch, a menu switch and a start switch, for example. Generally, buttons 302b through 302g are assigned various functions in accordance with the application being executed by game console 100. In an exemplary arrangement shown in FIG. 3, buttons 302b through 302d are linearly arranged along a front-to-back centerline of the top surface of housing 301. Buttons 302e through 302g are linearly arranged along a left-to-right line between buttons 302b and 302d. Button 302f may be recessed from a top surface of housing 701 to reduce the possibility of inadvertent pressing by a player grasping controller 107.

Button 302h is provided forward of cross-switch 302a on the top surface of the housing 301. Button 302h is a power switch for remote on-off switching of the power to game console 100. Button 302h may also be recessed from a top surface of housing 301 to reduce the possibility of inadvertent pressing by a player.

A plurality (e.g., four) of LEDs 304 is provided rearward of button 302c on the top surface of housing 301. Controller 107 is assigned a controller type (number) so as to be distinguishable from other controllers used with game console 100 and LEDs 304 may be used to provide a player a visual indication of this assigned controller number. For example, when controller 107 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a player holding controller 107. A button 302i is provided on a rear, sloped surface 308a of the recessed portion. Button 302i functions, for example, as an "A" button which can be used, by way of illustration, as a trigger switch in a shooting game.

As shown in FIG. 4, an imaging element 305a is provided on a front surface of controller housing 301. Imaging element 305a is part of the imaging information calculation section of controller 107 that analyzes image data received from markers 108a and 108b. Imaging information calculation section 305 has a maximum sampling period of, for example, about 200 frames/sec., and therefore can trace and analyze even relatively fast motion of controller 107. The techniques described herein of simulating the striking of an object can be achieved without using information from imaging information calculation section 305, and thus further detailed description of the operation of this section is omitted. Additional details may be found in Application Nos. 60/716,937, entitled "VIDEO GAME SYSTEM WITH WIRELESS MODULAR HANDHELD CONTROLLER," filed on Sep. 15, 2005; 60/732,648, entitled "INFORMATION PROCESSING PROGRAM," filed on Nov. 3, 2005; and application No. 60/732,649, entitled "INFORMATION PROCESSING SYSTEM AND PROGRAM THEREFOR," filed on Nov. 3, 2005. The entire contents of each of these applications are expressly incorporated herein.

Connector 303 is provided on a rear surface of controller housing 301. Connector 303 is used to connect devices to controller 107. For example, a second controller of similar or different configuration may be connected to controller 107 via connector 303 in order to allow a player to play games using game control inputs from both hands. Other devices including game controllers for other game consoles, input devices such as keyboards, keypads and touchpads and output devices such as speakers and displays may be connected to controller 107 using connector 303.

For ease of explanation in what follows, a coordinate system for controller 107 will be defined. As shown in FIGS. 3 and 4, a left-handed X, Y, Z coordinate system has been defined for controller 107. Of course, this coordinate system is described by way of example without limitation and the systems and methods described herein are equally applicable when other coordinate systems are used.

Figure 5:
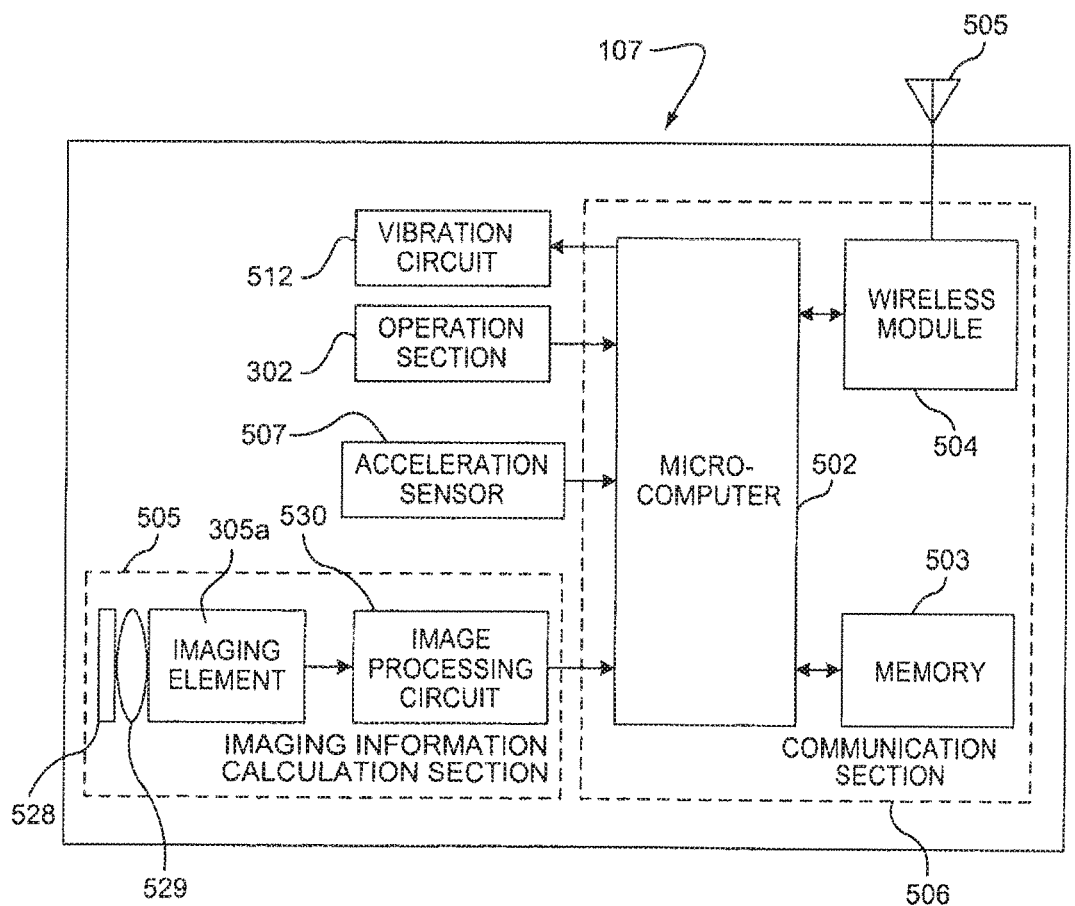
FIG. 5 is a block diagram of example controller 107 shown in FIG. 1.

As shown in the block diagram of FIG. 5, controller 107 includes a three-axis, linear acceleration sensor 507 that detects linear acceleration in three directions, i.e., the up/down direction (Z-axis shown in FIGS. 3 and 4), the left/right direction (X-axis shown in FIGS. 3 and 4), and the forward/backward direction (Y-axis shown in FIGS. 3 and 4). Alternatively, a two-axis linear accelerometer that only detects linear acceleration along each of the Y-axis and Z-axis, for example, may be used or a one-axis linear accelerometer that only detects linear acceleration along the Z-axis, for example, may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 107 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 107 (or another processor) to determine tilt, attitude or position of controller 107. Similarly, various movements and/or positions of controller 107 can be calculated through processing of the linear acceleration signals generated by acceleration sensor 507 when controller 107 containing acceleration sensor 307 is subjected to dynamic accelerations by, for example, the hand of a user, as will be explained in detail below.

In another embodiment, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity).

Returning to FIG. 5, imaging information calculation section 505 of controller 107 includes infrared filter 528, lens 529, imaging element 305a and image processing circuit 530. Infrared filter 528 allows only infrared light to pass therethrough from the light that is incident on the front surface of controller 107. Lens 529 collects and focuses the infrared light from infrared filter 528 on imaging element 305a. Imaging element 305a is a solid-state imaging device such as, for example, a CMOS sensor or a CCD. Imaging element 305a captures images of the infrared light from markers 108a and 108b collected by lens 529. Accordingly, imaging element 305a captures images of only the infrared light that has passed through infrared filter 528 and generates image data based thereon. This image data is processed by image processing circuit 520 which detects an area thereof having high brightness, and, based on this detecting, outputs processing result data representing the detected coordinate position and size of the area to communication section 506. From this information, the direction in which controller 107 is pointing and the distance of controller 107 from display 101 can be determined.

Vibration circuit 512 may also be included in controller 107. Vibration circuit 512 may be, for example, a vibration motor or a solenoid. Controller 107 is vibrated by actuation of the vibration circuit 512 (e.g., in response to signals from game console 100), and the vibration is conveyed to the hand of the player grasping controller 107. Thus, a so-called vibration-responsive game may be realized.

As described above, acceleration sensor 507 detects and outputs the acceleration in the form of components of three axial directions of controller 107, i.e., the components of the up-down direction (Z-axis direction), the left-right direction (X-axis direction), and the front-rear direction (the Y-axis direction) of controller 107. Data representing the acceleration as the components of the three axial directions detected by acceleration sensor 507 is output to communication section 506. Based on the acceleration data which is output from acceleration sensor 507, a motion of controller 107 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 505. Micro-computer 502 temporarily stores the data supplied thereto in memory 503 as transmission data for transmission to game console 100. The wireless transmission from communication section 506 to game console 100 is performed at predetermined time intervals. Because game processing is generally performed at a cycle of 1/60 sec. (16.7 ms), the wireless transmission is preferably performed at a cycle of a shorter time period. For example, a communication section structured using Bluetooth (registered trademark) technology can have a cycle of 5 ms. At the transmission time, micro-computer 502 outputs the transmission data stored in memory 503 as a series of operation information to wireless module 504. Wireless module 504 uses, for example, Bluetooth (registered trademark) technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 107. Game console 100 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 100 performs application processing. If communication section 506 is structured using Bluetooth (registered trademark) technology, controller 107 can also receive data wirelessly transmitted thereto from devices including game console 100.

FIGS. 6-9 are referenced in connection an explanation of simulating the hitting of drum. However, this explanation is provided by way of example without limitation and the system and method described herein may be readily adapted for use in a wide variety of manners to detect a moment of impact and/or a strength associated with the swinging or movement of a controller.

Figure 6:
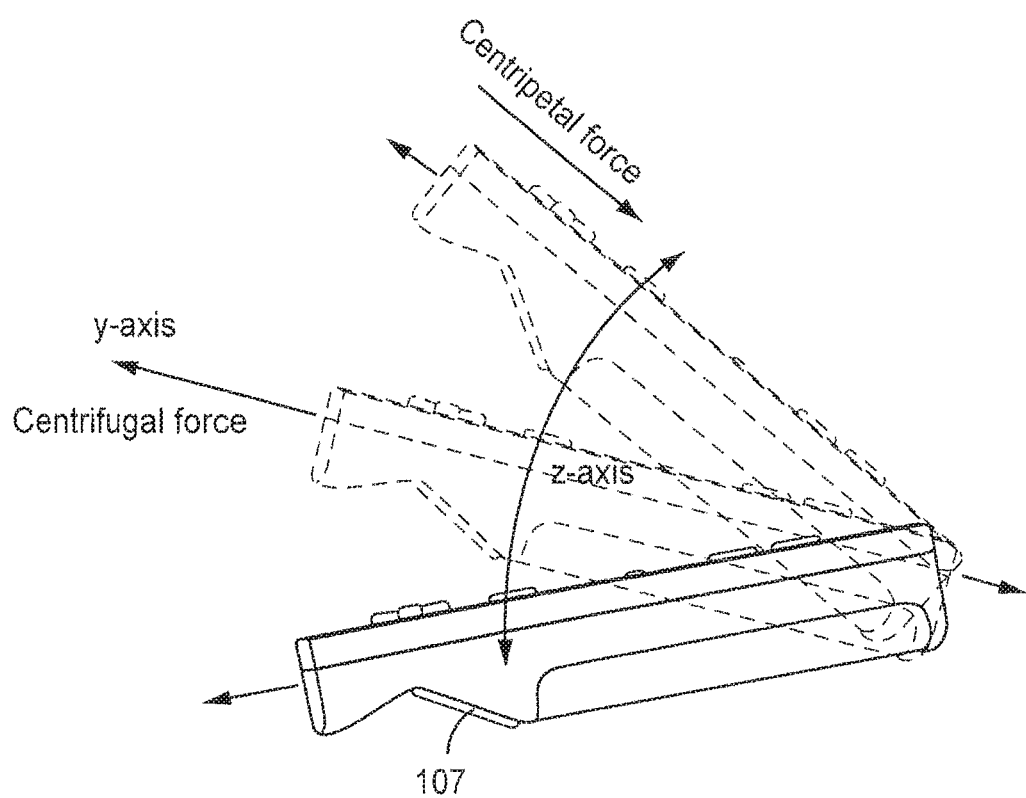
FIG. 6 illustrates movement of controller 107 during a simulated drum hit.

FIG. 6 illustrates movement of controller 107 during a simulated drum hit. As shown in FIG. 6, the movement generates Y-axis acceleration data and Z-axis acceleration data. The Y-axis acceleration data corresponds to a centripetal acceleration resulting from movement of acceleration sensor 507 along a curved path during the simulated drum hit. More specifically, the player's hand moves controller 107 in an arc, applying a centripetal force to the controller, which pulls it toward the center of the swing (toward the elbow). Acceleration sensor 507 detects Y-axis acceleration data corresponding to this centripetal force. The velocity of controller 107 can be derived from the Y-axis acceleration data (e.g., by integration) and this velocity is indicative of the strength of impact of the drum hit. The Z-axis acceleration data can be used to determine when the movement of controller 107 during the simulated drum hit starts and stops. Thus, the Z-axis acceleration data can be used to determine a moment of impact with the drum.

Figure 7A:
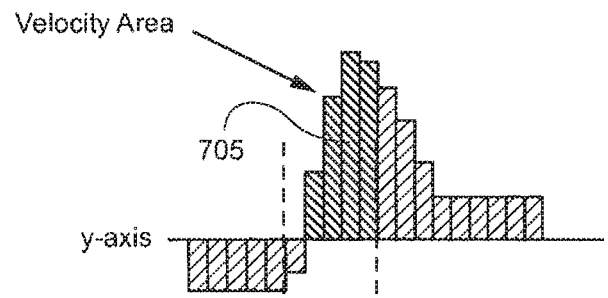
FIGS. 7A and 7B respectively show Y-axis acceleration data and Z-axis acceleration data for an illustrative simulated drum hit.
Figure 7B:
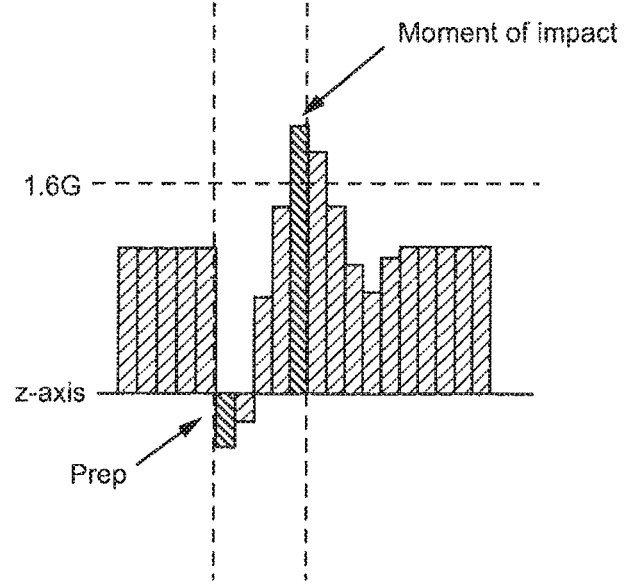

FIGS. 7A and 7B respectively show Y-axis acceleration data and Z-axis acceleration data for an illustrative simulated drum hit. With reference to FIG. 7B, the beginning of the simulated drum hit is shown as a "prep" time and corresponds to when the player moves controller 107 to begin the simulated drum hit. The Z-axis acceleration readings before the simulated drum hit correspond to a stationary state of the controller in which the Z-axis acceleration is 1 g (i.e., the downward acceleration due to gravity). The player moves controller 107 upward in preparation for the simulated drum hit and the "prep" point is the beginning of the downward movement from the raised position. The tail end of raising the controller upward can also cause the triggering of this "prep" point and merge into the beginning of the downward movement. For purposes of simplicity and explanation, the discussion herein assumes the "prep" point corresponds to the beginning of the downward movement.

The moment of impact is determined when the Z-axis acceleration data exceeds a maximum threshold. With reference to FIG. 7B, this maximum threshold is 1.6 g. Of course, this particular maximum threshold is provided by way of example without limitation and other threshold values may be used.

With reference to FIG. 7A, Y-axis acceleration data after the "prep" time until the moment of impact is used to determine the strength of the impact. In particular, the size of area 705 corresponding to the Y-axis acceleration data after the prep time until the moment of impact corresponds to the velocity of the controller (i.e., the integration of the acceleration) and is used as an indicator of the strength of impact. Specifically, the positive acceleration is added together to form area 705. The greater the area (i.e., greater velocities during the simulated drum hit), the greater the strength of impact. As will be discussed below with reference to FIG. 8A, the size of the area 705 can be multiplied by a scaling factor to determine a sound volume associated with the drum hit.

Figure 8A:
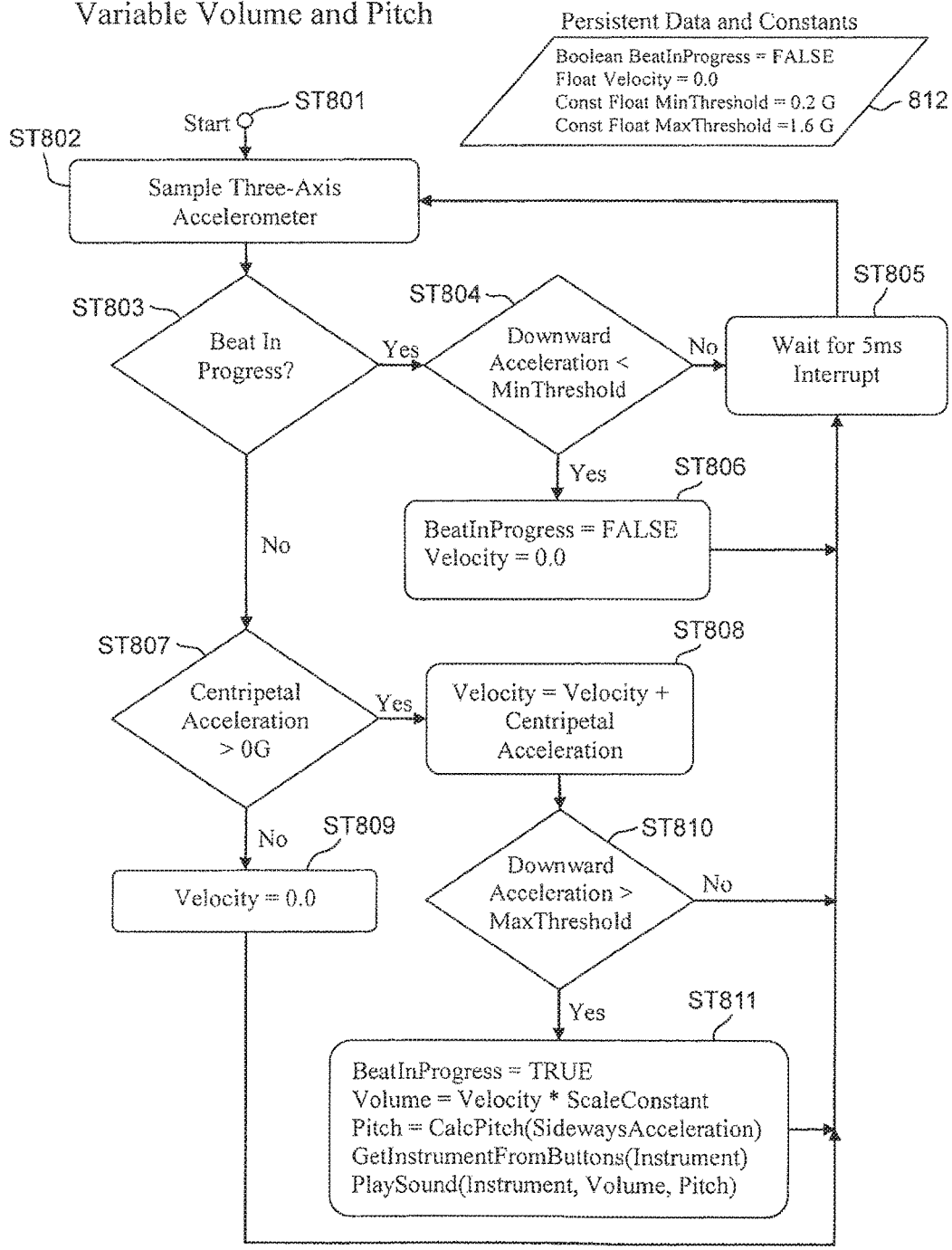
FIG. 8A is a flow chart of an example drum hit detection method with variable volume and pitch.

FIG. 8A is a flow chart used in an explanation of an example drum hit detection method that includes variable volume and pitch. The method uses some persistent data and constants, which are shown in box 812. BeatInProgress is a Boolean variable that is initially set to FALSE. Velocity is a floating-point variable that is initially set to 0.0. MinThreshold is a constant floating-point variable that is set to 0.2 G, where G represents the acceleration of gravity. MaxThreshold is a constant floating-point variable that is set to 1.6 G.

The method starts at ST 801 and proceeds to ST 802 at which the three-axis accelerometer is sampled to provide X-axis, Y-axis and Z-axis acceleration data.

At ST 803, a determination is made with reference to the BeatInProgress variable as to whether a drum sound was just recently played. If the variable is set to FALSE (i.e., determination is NO), the method proceeds to ST 807 at which a determination is made as to whether the centripetal acceleration is greater than 0. As shown with reference to FIG. 6, the centripetal acceleration can be determined with reference to the Y-axis acceleration data. If the centripetal acceleration is not greater than 0, the velocity variable is set to 0.0 at ST 809 and the method proceeds to ST 805. If the centripetal acceleration is greater than 0, the controller is being swung at this time and a new velocity is determined at ST 808 by adding a velocity based on the centripetal acceleration to the current velocity. More specifically, adding the acceleration each frame (each slice) corresponds to calculating the area of the acceleration. By way of example without limitation, if each acceleration slice is considered to be one (1) unit wide, then the area of the slice is simply its magnitude (area of slice=magnitude×1). Adding up each slice provides the total area. The method then proceeds to ST 810.

At ST 810, a determination is made as to whether the downward acceleration exceeds the MaxThreshold value (in this case 1.6 G). If not, the method proceeds to ST 805. At ST 805, an interrupt time is awaited, after which the method returns to ST 802. If the acceleration determined at ST 810 exceeds the MaxThreshold value, the method proceeds to ST 811.

At ST 811, the BeatInProgress variable is set to TRUE; the volume is set to a value derived from the calculated velocity and a scale constant; and the pitch is derived from a CalcPitch function based on the sideways acceleration. More specifically, CalcPitch is a routine that permits the player to twist controller 107 (e.g., like a screwdriver) to obtain a slightly different pitch. This twist is detected from X-axis acceleration data from acceleration sensor 507. By way of example without limitation, the simulated striking of a drum with controller 107 held flat (X-axis acceleration data equal to 0 G) would result in a specified pitch. The simulated striking of a drum with controller 107 tilted to the left or right (X-axis acceleration data not equal to 0 G) results in a pitch that is either higher or lower than the original specified pitch of the drum. It will be appreciated that the control of pitch as a function of twisting may be omitted if desired.

A GetInstrumentFromButtons routine retrieves a process for simulating the playing of a particular instrument. In the present description, it is assumed that the player presses or holds one or more of the buttons on controller 107 corresponding to a drum. By pressing other buttons alone or in combination, the playing of other instruments or different types of drums can be simulated. A PlaySound routine plays a sound for the instrument determined by the GetInstrumentFromButtons routine in accordance with the determined volume and pitch. After the processes at ST 811, the method proceeds to ST 805 where an interrupt time is awaited.

If at ST 803, it is determined that a beat is in progress, a determination is made at ST 804 as to whether the downward acceleration is less than MinThreshold (in this case 0.2 G). If not, the method proceeds to ST 805 where an interrupt time is awaited. If so, the method proceeds to ST 806, where BeatInProgress is set to False and the velocity variable is set to 0.0. The method then proceeds to ST 805 where an interrupt time is awaited. The MinThreshold check determines the occurrence of the "Prep point". Thus, if the acceleration passes the MinThreshold (moving from positive downward below the MinThreshold), then the "Prep point" is detected.

The accelerometer data described above may also be used to show a game character on display 101 that is playing the drums in correspondence with the movements of controller 107 by the player. Also, at the moment of impact as determined in the example method described above, vibration circuit 512 in controller 107 may be activated to provide a tactile output so that the player is provided a sensation when the drum is struck.

Figure 9:
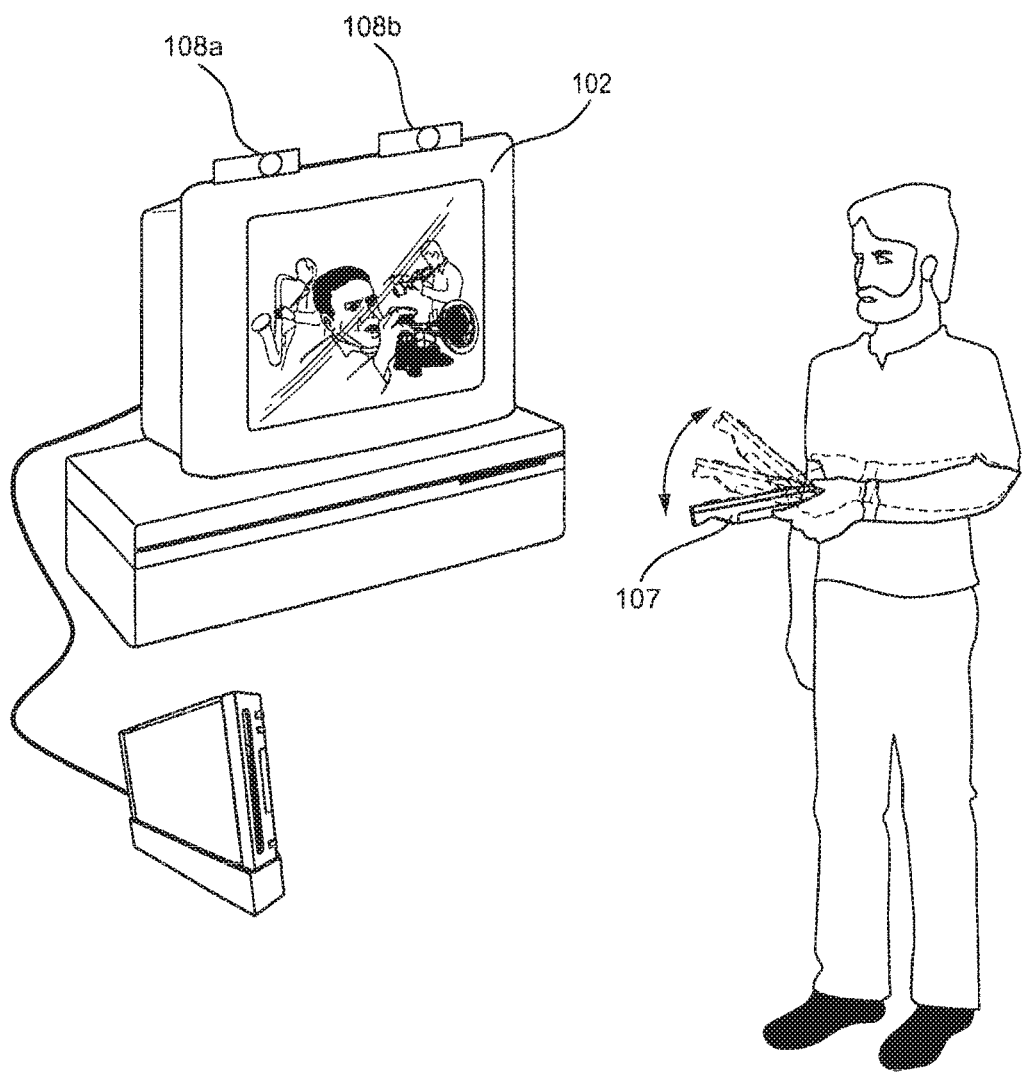
FIG. 9 illustrates a player playing a video game using simulated drum hits.

FIG. 9 shows an example display 901 for a game in which the drum hit detection method described herein may be implemented. The game may involve a player controlling a game character that plays drums in a band. The band may include other band members playing different instruments either in accordance under the control of the game program or of inputs from other players. In one example game, the player can select a song for the band to play from a menu of songs. In this example, the drumming for the song is provided by the player using controller 107 as described herein. In another example game, the player can elect to record a drum solo generated using controller 107.

The example method described above can be readily extended to an arrangement in which a controller is provided for each hand. In this arrangement, a player can use each controller to simulate striking different drums, if desired. In another arrangement, two players can cooperate to play a drum duet, each of the players holding a controller in one or both of their hands. In yet another arrangement, a footpad controller (e.g., a simple switch) can be used to control a bass drum, which need not vary in volume. Thus, in this arrangement, a player holds a controller in each hand to hit the drums and uses his/her foot to hit the bass drum switch.

While the above-described example method uses velocities derived from the Y-axis accelerometer data, velocities derived from the Z-axis accelerometer data can also be used. In this case, only Z-axis accelerometer data needs to be sampled.

While the example method is described above with reference to simulating the playing of a drum, the method is readily applicable to simulated sword-fighting, boxing and other applications. The accelerometer data that is used will depend on the particular application. For example, a boxing game may use the Y-axis acceleration data to determine the strength and/or moment of impact of a punch. A sword-fighting game may, for example, use the Y-axis and Z-axis accelerometer data for up/down strokes and the X-axis and Y-axis accelerometer data for side-to-side strokes.

Figure 8B:
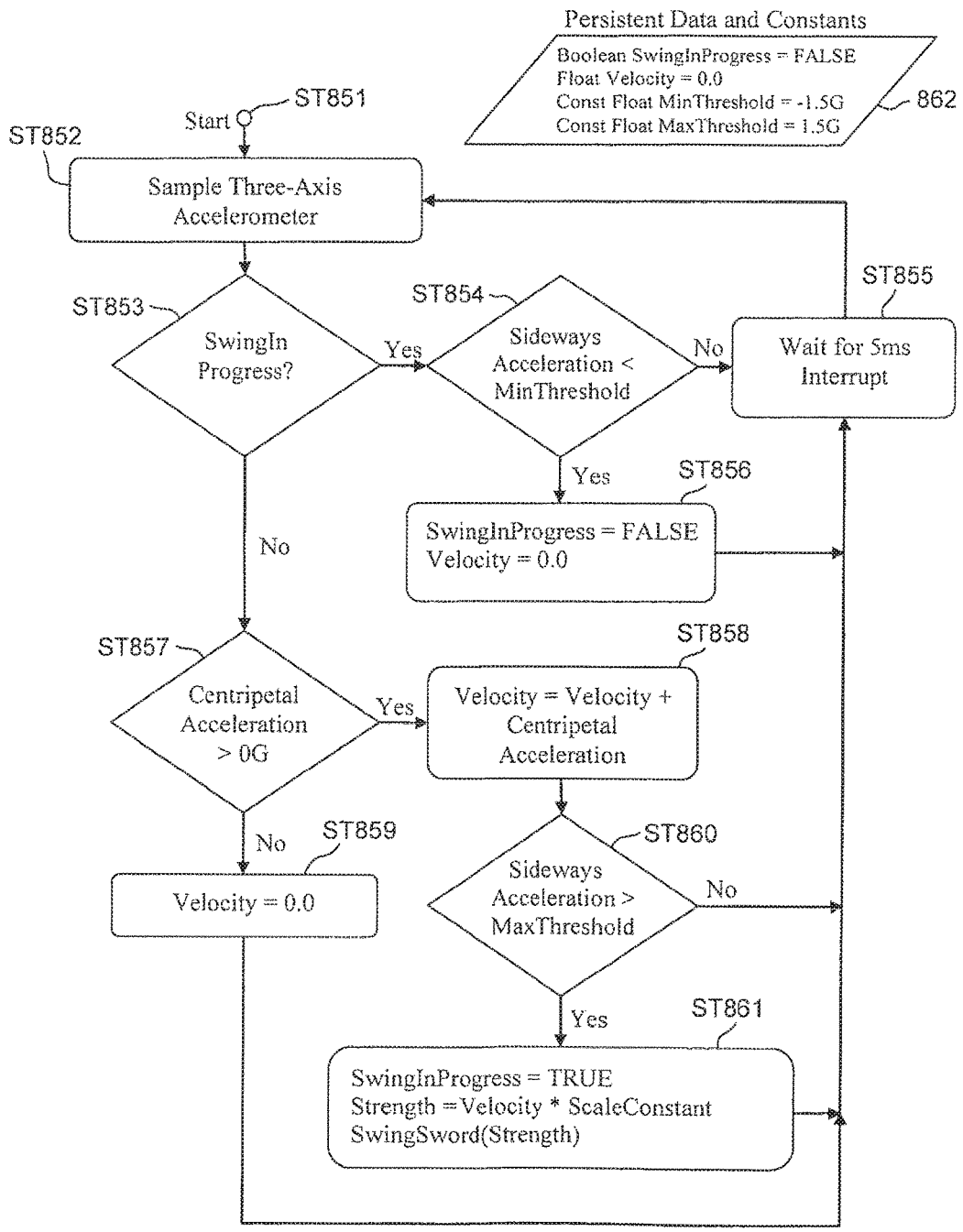
FIG. 8B is a flow chart of an example sword swing detection method with variable strength.

FIG. 8B is a flow chart of an example sword swing detection method with variable strength. The method uses some persistent data and constants, which are shown in box 862. SwingInProgress is a Boolean variable that is initially set to FALSE. Velocity is a floating-point variable that is initially set to 0.0. MinThreshold is a constant floating-point variable that is set to −1.5 G. MaxThreshold is a constant floating-point variable that is set to 1.5 G.

The example FIG. 8B flow chart is for a sideways sword swing (i.e., only detecting a right to left swing in this example). Multiple accelerometer readings and processing routines would need to work independently and simultaneously to detect left-to-right, right-to-left, up-to-down, and down-to-up, or whatever combination or subtlety is required.

As the swing begins, the x-axis experiences a very large negative acceleration (analogous to the drum hit). As the sword swing ends, the x-axis experiences a very large positive acceleration (analogous to the drum hit). Since the sideways motion is not affected by gravity, MaxThreshold and MinThreshold are balanced (symmetric) around zero (−1.5 G and 1.5 G). In the drum example, gravity is always affecting the up/down acceleration, so MaxThreshold and MinThreshold are asymmetric around zero (with the max skewed by about 1 G).

At ST 853, a determination is made with reference to the SwingInProgress variable as to whether a swing is currently in progress. If the variable is set to FALSE (i.e., determination is NO), the method proceeds to ST 857 at which a determination is made as to whether the centripetal acceleration is greater than 0 G. Along the lines of the above discussion with reference to FIG. 6, the centripetal acceleration can be determined with reference to the Y-axis acceleration data. If the centripetal acceleration is not greater than 0 G, the velocity variable is set to 0.0 at ST 859 and the method proceeds to ST 855. If the centripetal acceleration is greater than 0 G, the controller is being swung at this time and a new velocity is determined at ST 858 by adding a velocity based on the centripetal acceleration to the current velocity. More specifically, adding the acceleration each frame (each slice) corresponds to calculating the area of the acceleration. By way of example without limitation, if each acceleration slice is considered to be one (1) unit wide, then the area of the slice is simply its magnitude (area of slice=magnitude×1). Adding up each slice provides the total area. The method then proceeds to ST 860.

At ST 860, a determination is made as to whether the sideways acceleration exceeds the MaxThreshold value (measured, e.g., using x-axis acceleration data). If not, the method proceeds to ST 855. At ST 855, an interrupt time is awaited, after which the method returns to ST 852. If the acceleration determined at ST 860 exceeds the MaxThreshold value, the method proceeds to ST 861.

At ST 861, the SwingInProgress variable is set to TRUE; the strength is set equal to the velocity multiplied by a scale constant; and a SwingSword routine for simulating the swinging of a sword (e.g., by generating a corresponding display or outputting a corresponding sound) is executed based on the calculated strength. After the processes at ST 861, the method proceeds to ST 855 where an interrupt time is awaited.

If at ST 853, it is determined that a swing is in progress, a determination is made at ST 854 as to whether the sideways acceleration is less than MinThreshold. If not, the method proceeds to ST 855 where an interrupt time is awaited. If so, the method proceeds to ST 856, where SwingInProgress is set to False and the velocity variable is set to 0.0. The method then proceeds to ST 855 where an interrupt time is awaited.

While the above description is given in terms of accelerometers, other arrangements from which the above-described accelerations can be derived may also be used.

A program incorporating the methods described herein can, for example, be tangibly embodied on optical disk 104 or some other computer-readable medium. In another example, the program may be available for downloading over the internet so that the program may be delivered via a communication network. Further, a carrier wave may be modulated by a signal representing the corresponding program and an obtained modulated wave may be transmitted, so that an apparatus that receives the modulated wave may demodulate the modulated wave to restore the corresponding program.

While the systems and methods have been described in connection with what is presently considered to practical and preferred embodiments, it is to be understood that these systems and methods are not limited to the disclosed embodiments, but on the contrary, is intended to cover various modifications and equivalent arrangements included within the spirit and scope of the appended claims.

At least the following is claimed:

1. A system, comprising:
  a hand held controller, comprising:
    a housing;
    a directional input located on a first surface of the housing;
    at least one input button located on the first surface of the housing;
    an accelerometer; and
    a processing system having a processor, a memory, and a transmitter configured to transmit data processed by the processing system, and
  an information processing device, comprising:
    a processing system including, at least, a processor, a memory, and a receiver configured to receive data transmitted by the transmitter, the processing system configured to:
      determine a first output for a first axis of the accelerometer resulting from the hand held controller being moved in free space;
      determine a second output for a second axis of the accelerometer resulting from the hand held controller being moved in free space; and
      provide responsive output based on, at least, the first output for the first axis of the accelerometer and the second output for the second axis of the accelerometer, at least the first and/or second output reporting data indicative of at least a centripetal force resulting from the hand held controller being moved in free space.

2. The system of claim 1, wherein the second output corresponds to a magnitude related to the hand-held controller moving in free space along a curved path.

3. The system of claim 1, wherein the responsive output is associated with simulated swinging of a sword.

4. The system of claim 1, wherein the first output corresponds to a moment of impact of a swinging motion.

5. The system of claim 1, wherein the second output corresponds to a strength of a swinging motion.

6. The system of claim 1, wherein the processing system determines a moment of impact when the first output for the first axis of the accelerometer exceeds a specified value.

7. The system of claim 6, wherein the output is responsive to the determined moment of impact and a determined magnitude corresponding to the centripetal force resulting from moving the hand held controller in free space along a curved path.

8. The system of claim 1, wherein the hand held controller further includes a vibration circuit, and the responsive output includes a tactile sensation resulting from the vibration circuit of the hand held controller.

9. The system of claim 1, wherein the swinging motion relates to a simulated striking of a virtual three dimensional character in a virtual three dimensional space of a video game program.

10. The system of claim 1, wherein the responsive output corresponds to, at least, a swinging motion, and at least the first and/or second output reporting data indicative of at least the centripetal force resulting from the hand held controller being moved in free space as the hand held controller is being moved in a particular motion.

11. A system, comprising:
  a first hand held controller, comprising:
    a housing;
    a directional input located on a first surface of the housing;
    an accelerometer; and
    a processing system having a processor, a memory, and a transmitter configured to transmit data processed by the processing system, and
  a second hand held controller, comprising:
    a housing;
    a directional input located on a first surface of the housing;
    an accelerometer; and
    a processing system having a processor, a memory, and a transmitter configured to transmit data processed by the processing system, and
  an information processing device, comprising:
    a processing system including, at least, a processor, a memory, and a receiver configured to receive data transmitted by the transmitter of the first and/or second hand held controller, the processing system configured to:
      determine a first output for a first axis of the accelerometer, of the first and/or second hand held controller, resulting from the first and/or second hand held controller moving in free space;
      determine a second output for a second axis of the accelerometer, of the first and/or second hand held controller, resulting from the first and/or second hand held controller moving in free space; and
      provide responsive output based on, at least, the first output for the first axis of the accelerometer and the second output for the second axis of the accelerometer of the first and/or second hand held controller, at least the first and/or second output reporting data indicative of at least a centripetal force resulting from the first and/or second hand held controller being moved in free space.

12. The system of claim 11, wherein the responsive output is associated with simulated swinging of an object.

13. The system of claim 11, wherein the responsive output is associated with simulated swinging of a sword.

14. The system of claim 11, wherein the first output corresponds to a moment of impact of a swinging motion.

15. The system of claim 11, wherein the second output corresponds to a strength of a swinging motion.

16. The system of claim 11, further comprising determining a moment of impact when the first output for the first axis of the accelerometer exceeds a specified value.

17. The system of claim 16, wherein the output is responsive to the determined moment of impact and a determined magnitude corresponding to the centripetal force resulting from moving the first and/or second hand held controller in free space along a curved path.

18. The system of claim 11, wherein the first and/or second hand held controller further includes a vibration circuit, and the responsive output includes a tactile sensation resulting from the vibration circuit of the first and/or second hand held controller.

19. A non-transitory computer-readable storage medium comprising computer program code embodied thereon which, when executed by an information processing device having a processor, causes the processor to:
 determine a first output for a first axis of an accelerometer resulting from a hand held controller moving in free space;
 determine a second output for a second axis of the accelerometer resulting from a hand held controller moving in free space; and
 provide responsive output based on, at least, the first output for the first axis of the accelerometer and the second output for the second axis of the accelerometer, at least the first and/or second output reporting data indicative of at least a centripetal force resulting from the hand held controller being moved in free space.

20. The non-transitory computer readable storage medium of claim 19, wherein the responsive output is associated with simulated swinging of an object.

21. The non-transitory computer readable storage medium of claim 19, further having computer program code that causes the processor to:
 determine a first output for a first axis of an accelerometer resulting from a second hand held controller moving in free space;
 determine a second output for a second axis of the accelerometer, at least the first and/or second output reporting data indicative of at least a centripetal force resulting from the second hand held controller moving in free space; and
 provide responsive output based on, at least, the first output for the first axis of the accelerometer and the second output for the second axis of the accelerometer of the second hand held controller.

* * * * *